US011165455B2

(12) United States Patent
Gustavsson et al.

(10) Patent No.: US 11,165,455 B2
(45) Date of Patent: Nov. 2, 2021

(54) INTERFERENCE MITIGATION

(71) Applicant: Telefonaktiebolaget LM Ericsson (publ), Stockholm (SE)

(72) Inventors: Ulf Gustavsson, Gothenburg (SE); Erik G. Larsson, Linköping (SE); Christopher Mollén, Norrköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 442 days.

(21) Appl. No.: 16/091,850

(22) PCT Filed: May 16, 2018

(86) PCT No.: PCT/EP2018/062721
§ 371 (c)(1),
(2) Date: Oct. 5, 2018

(87) PCT Pub. No.: WO2019/219185
PCT Pub. Date: Nov. 21, 2019

(65) Prior Publication Data
US 2021/0083701 A1    Mar. 18, 2021

(51) Int. Cl.
*H04B 1/10* (2006.01)
*H04B 1/12* (2006.01)
(Continued)

(52) U.S. Cl.
CPC ........... *H04B 1/1027* (2013.01); *H04B 1/04* (2013.01); *H04B 1/123* (2013.01); *H04B 1/525* (2013.01); *H04B 1/7097* (2013.01)

(58) Field of Classification Search
CPC .... H04B 1/1027; H04B 1/7097; H04B 1/123; H04B 1/525; H04B 7/0413; H04B 7/0854
See application file for complete search history.

(56) References Cited

U.S. PATENT DOCUMENTS 9,197,264 B1    11/2015 Yoo et al.
2007/0184782 A1*  8/2007 Sahota ............... H04B 1/10
                                                    455/63.1
(Continued)

FOREIGN PATENT DOCUMENTS

WO    2017/153921 A1    9/2017
WO    2017/174240 A1    10/2017

OTHER PUBLICATIONS

Mahmoud E. Abdelgelil and Hlaing Minn, "Impact of Nonlinear RFI and Countermeasure for Radio Astronomy Receivers", The University of Texas at Dallas, Feb. 21, 2018, IEEE Access (Year: 2018).*

(Continued)

*Primary Examiner* — Aristocratis Fotakis
(74) *Attorney, Agent, or Firm* — Sage Patent Group

(57) ABSTRACT

A method is disclosed of a wireless receiver configured for spatial selective reception. The method is for mitigation of an interfering signal leaked into a frequency range of a desired signal due to non-linearity of hardware components of the receiver.

The method comprises receiving a composite signal comprising the desired signal and the interfering signal, filtering the composite signal using a spatial filter for a channel response of the desired signal to provide a first intermediate signal component, and filtering the composite signal using a spatial filter for a channel response of the interfering signal to provide a second intermediate signal component.

The method also comprises estimating a squared amplitude of the interfering signal based on the second intermediate signal component and a model of the non-linearity, and estimating the desired signal based on the first intermediate signal component, the estimated squared amplitude of the interfering signal, and the model of the non-linearity.

(Continued)

Corresponding apparatus, wireless receiver, wireless communication device and computer program product are also disclosed.

18 Claims, 3 Drawing Sheets

(51) Int. Cl.
*H04B 1/04* (2006.01)
*H04B 1/525* (2015.01)
*H04B 1/7097* (2011.01)

(56) References Cited

U.S. PATENT DOCUMENTS

| | | | | |
|---|---|---|---|---|
| 2008/0039045 | A1* | 2/2008 | Filipovic | H04B 1/123 |
| | | | | 455/295 |
| 2010/0159837 | A1* | 6/2010 | Dent | H04B 1/525 |
| | | | | 455/63.1 |
| 2014/0051378 | A1* | 2/2014 | Daneshrad | H04B 1/7102 |
| | | | | 455/307 |
| 2014/0139286 | A1* | 5/2014 | Laporte | H04L 27/368 |
| | | | | 330/149 |
| 2015/0065058 | A1* | 3/2015 | Wang | H04B 15/00 |
| | | | | 455/63.1 |
| 2016/0302209 | A1* | 10/2016 | Behravan | H04L 1/0009 |
| 2017/0324462 | A1* | 11/2017 | Chen | H04B 7/0868 |
| 2017/0331502 | A1* | 11/2017 | Gomaa | H04L 25/0242 |
| 2019/0081659 | A1* | 3/2019 | Ratnam | H04L 5/0057 |
| 2019/0222242 | A1* | 7/2019 | Frank | H04L 5/0066 |
| 2019/0305924 | A1* | 10/2019 | Kim | H04L 5/0073 |
| 2021/0105019 | A1* | 4/2021 | Gupta | H03M 1/1085 |

OTHER PUBLICATIONS

International Search Report and Written Opinion issued in International Application No. PCT/EP2018/062721, dated Feb. 12, 2019, 14 pages.

Mollén, Christopher et al., "Impact of Spatial Filtering on Distortion from Low-Noise Amplifiers in Massive MIMO Base Stations", arXiv:1712.09612v1 [cs.IT], Dec. 27, 2017, 11 pages.

* cited by examiner

US 11,165,455 B2

INTERFERENCE MITIGATION

CROSS REFERENCE TO RELATED APPLICATION(S)

This application is a 35 U.S.C. § 371 National Stage of International Patent Application No. PCT/EP2018/062721, filed May 16, 2018, designating the United States.

TECHNICAL FIELD

The present disclosure relates generally to the field of wireless communication reception. More particularly, it relates to mitigation of an interfering signal leaked into a frequency range of a desired signal due to non-linearity of hardware components of the receiver.

BACKGROUND

If low-cost and/or power efficient receiver frontends are used for advanced antenna systems (AAS), significant hardware distortion effects are typically experienced.

Examples of such distortion effects include non-linearity in the receiver frontends, which may, for example, cause signals from an interferer (e.g. an out-of-band blocker) to leak into the frequency band of the signal to be demodulated (the desired signal).

This may be particularly detrimental, for example, in a massive multiple-input, multiple-output (MIMO) system where spatial processing (e.g., maximum-ratio combining, zero-forcing approaches, etc.) is used in the receiver. In such scenarios, out-of-band interference that leaks into the frequency band of the desired signal can combine constructively in the spatial processing. This means that the out-of-band blocker may effectively receive the same antenna array gain as the desired signal.

To avoid such problems, a common approach for typical advanced antenna systems (AAS) is to set strict requirements for receiver sensitivity and/or dynamic range, which may be fulfilled by use of highly linear low noise amplifiers and/or high-resolution analog-to-digital converters (ADCs). However, highly linear low noise amplifiers and high-resolution ADCs are typically relatively costly. Furthermore, their use typically results in relatively high power consumption.

Therefore, there is a need for alternative approaches to interference mitigation. Preferably, such alternative approaches mitigates leakage of out-of-band interference into the frequency band of the desired signal, while keeping cost and/or power consumption at a relatively low level.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by a method of a wireless receiver configured for spatial selective reception, for mitigation of an interfering signal leaked into a frequency range of a desired signal due to non-linearity of hardware components of the receiver.

The method comprises receiving a composite signal comprising the desired signal and the interfering signal, filtering the composite signal using a spatial filter for a channel response of the desired signal to provide a first intermediate signal component, and filtering the composite signal using a spatial filter for a channel response of the interfering signal to provide a second intermediate signal component.

The method also comprises estimating a squared amplitude of the interfering signal based on the second intermediate signal component and a model of the non-linearity, and estimating the desired signal based on the first intermediate signal component, the estimated squared amplitude of the interfering signal, and the model of the non-linearity.

In some embodiments, the model of the non-linearity is a polynomial function wherein each term consists of the product of a coefficient, an input variable, and a squared absolute value of the input variable.

In some embodiments, estimating the squared amplitude of the interfering signal comprises approximating an expression for the second intermediate signal component by two or more of its leading terms, wherein the expression for the second intermediate signal component is determined by the model of the non-linearity, and solving an equation for the squared amplitude of the interfering signal, wherein the equation for the squared amplitude of the interfering signal is formed by the second intermediate signal component and the approximated expression for the second intermediate signal component.

In some embodiments, approximating the expression for the second intermediate signal component comprises approximating the second intermediate signal component, $\hat{s}_2(t)$, as $\hat{s}_2(t) \approx s_2(t)(1+c(2|s_1(t)|^2+|s_2(t)|^2))$, wherein $s_1(t)$ represents the desired signal, $s_2(t)$ represents the interfering signal, and c is a parameter of the model of the non-linearity.

In some embodiments, approximating the expression for the second intermediate signal component comprises disregarding contributions by the desired signal.

In some embodiments, the equation for the squared amplitude of the interfering signal is $|\hat{s}_2(t)|^2 = |s_2(t)|^2|1+c|s_2(t)|^2|^2$, wherein $\hat{s}_2(t)$ represents the second intermediate signal component and $s_2(t)$ represents the interfering signal.

In some embodiments, estimating the desired signal comprises approximating an expression for the first intermediate signal component by two or more of its leading terms, wherein the expression for the first intermediate signal component is determined by the model of the non-linearity and comprises the squared amplitude of the interfering signal as an interfering signal variable, and wherein approximating comprises disregarding contributions by the squared amplitude of the desired signal, and solving an equation for the desired signal, wherein the equation for the desired signal is formed by the first intermediate signal component and the approximated expression for the first intermediate signal component wherein the estimated squared amplitude of the interfering signal is used as a value of the interfering signal variable.

In some embodiments, approximating the expression for the first intermediate signal component comprises approximating the first intermediate signal component, $\hat{s}_1(t)$, as $\hat{s}_1(t) \approx s_1(t)(1+2c|s_2(t)|^2)$, wherein $s_1(t)$ represents the desired signal, $s_2(t)$ represents the interfering signal, and c is a parameter of the model of the non-linearity.

In some embodiments, the equation for the desired signal is $s_1(t)=\hat{s}_1(t)/(1+2c|s_2(t)|^2)$, wherein $s_1(t)$ represents the desired signal, $\hat{s}_1(t)$ represents the first intermediate signal component and $|s_2(t)|^2$ represents the interfering signal variable.

In some embodiments, the method further comprises estimating the channel response of the interfering signal.

In some embodiments, the wireless receiver comprises a plurality of receive antenna elements for the spatial selective reception, wherein two or more of the receive antenna elements are configured for estimation of the channel response of the interfering signal.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for a wireless receiver configured for spatial selective reception, for mitigation of an interfering signal leaked into a frequency range of a desired signal due to non-linearity of hardware components of the receiver.

The apparatus comprises controlling circuitry configured to cause reception of a composite signal comprising the desired signal and the interfering signal, filtering of the composite signal using a spatial filter for a channel response of the desired signal to provide a first intermediate signal component, and filtering of the composite signal using a spatial filter for a channel response of the interfering signal to provide a second intermediate signal component.

The controlling circuitry is also configured to cause estimation of a squared amplitude of the interfering signal based on the second intermediate signal component and a model of the non-linearity, and estimation of the desired signal based on the first intermediate signal component, the estimated squared amplitude of the interfering signal, and the model of the non-linearity.

A fourth aspect is a wireless receiver comprising the apparatus of the third aspect.

A fifth aspect is a wireless communication device comprising one or more of the apparatus of the third aspect and the wireless receiver of the fourth aspect.

In some embodiments, any of the above aspects may additionally have features identical with or corresponding to any of the various features as explained above for any of the other aspects.

An advantage of some embodiments is that alternative approaches to interference mitigation are provided.

Another advantage of some embodiments is that leakage of out-of-band interference into the frequency band of the desired signal is mitigated.

Yet an advantage of some embodiments is that interference mitigation is less costly and/or less power consuming than if highly linear low noise amplifiers and/or high-resolution analog-to-digital converters are used to mitigate leakage of out-of-band interference into the frequency band of the desired signal.

Yet other advantages of some embodiments include:
that use of one or more of: power efficient low-noise amplifiers (LNAs), low-resolution ADCs, and low-resolution automatic gain control (AGC) components is enabled,
that error vector magnitude (EVM) may be reduced compared to at least some prior art approaches,
that higher data rates may be allowed in the presence of interference (e.g., a blocker) compared to at least some prior art approaches, and
that the system is more robust against interference (e.g., blocking) compared to at least some prior art approaches.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described for mitigation of an interfering signal leaked into a frequency range of a desired signal due to non-linearity of hardware components of the receiver.

Generally, a typical model of the non-linearity may be expressed as a polynomial function wherein each term consists of the product of a coefficient, an input variable, and a squared absolute value of the input variable.

For example, a third order model of amplifier non-linearity may be defined as $$y_m(t)=b_1x_m(t)+b_3x_m(t)|x_m(t)|^2,$$

where $y_m(t)$ denotes the output of the amplifier m at time t, $x_m(t)$ denotes the input of the amplifier m at time t, and $b_1$ and $b_3$ denote the first and third order coefficients. Generally, a model of amplifier non-linearity of order P (where P is an odd number) may be defined as $$y_m(t)=\Sigma_{p=1,3,\ldots,P}b'_px_m(t)|x_m(t)|^{P-1},$$

where $b'_p$ denotes the p-th order coefficient. Another way to express this model of amplifier non-linearity is $$y_m(t) = \Sigma_{q=1}^{Q} v_{2q-1} x_m(t) |x_m(t)|^{2(q-1)},$$

where $Q=(P+1)/2$.

In the following, a third order model will be used as illustration if not stated otherwise. Furthermore, a receiver with M antenna elements will be assumed, wherein each antenna element is associated with a corresponding non-linear amplifier (e.g., an LNA). It will also be assumed that there are two transmitters, emitting a desired signal $s_1(t)$ and an interfering signal $s_2(t)$, respectively.

The interfering signal may be transmitted in the same frequency band as the desired signal, or in an adjacent frequency band. Even if the interfering signal and the desired signal are transmitted in different frequency bands, the non-linearity of the LNAs can make the interfering signal leak into the frequency band of the desired signal and cause interference. This is particularly detrimental if the received power of the interference signal (e.g., a blocker) is much higher than the received power of the desired signal.

Figure 1:
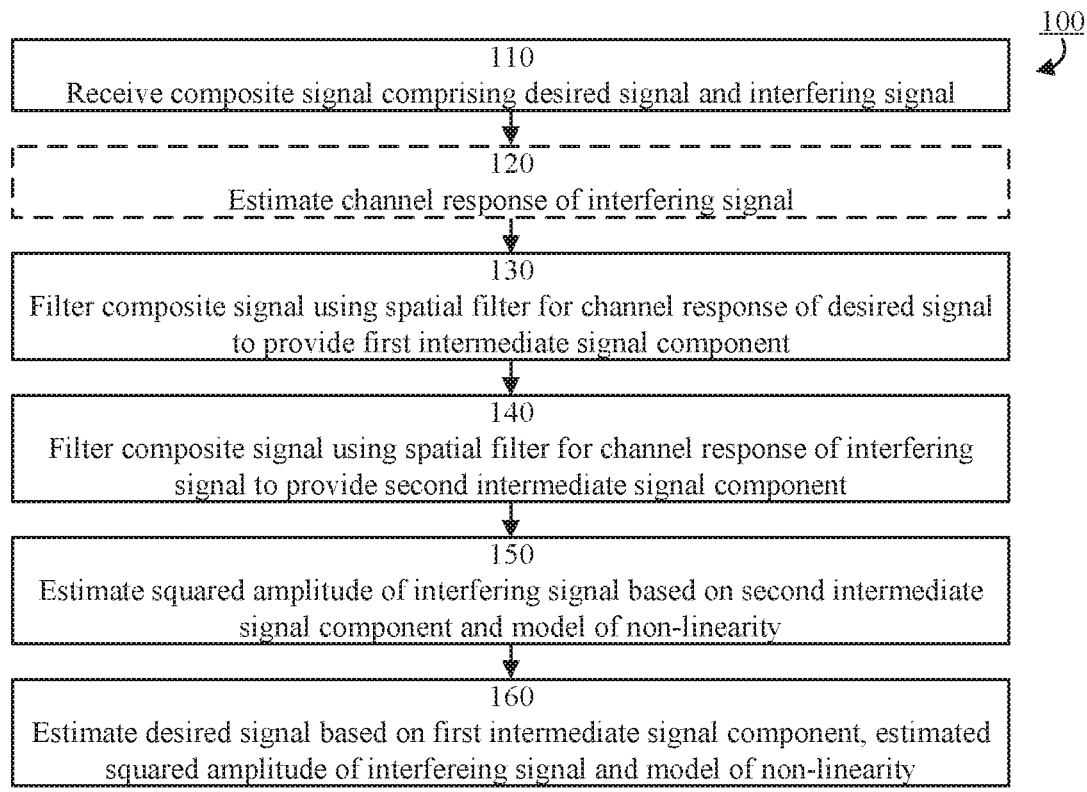
FIG. 1 is a flowchart illustrating example method steps according to some embodiments.

FIG. 1 illustrates an example method 100 according to some embodiments. The method may be performed by a wireless receiver configured for spatial selective reception.

The method starts in step 110, where a composite signal comprising a desired signal $s_1(t)$ and an interfering signal $s_2(t)$ is received. The interfering signal may be leaked into a frequency range of the desired signal due to non-linearity of hardware components (e.g., low-noise amplifiers, LNAs) of the receiver.

In optional step 120, the channel response $\varphi_2$ (e.g., including an angle of arrival for a dominating channel path, such as a line-of-sight (LOS) path) of the interfering signal is estimated. Alternatively, knowledge regarding the channel response of the interfering signal may be otherwise obtained (e.g., known beforehand or via reception of a signal indicative of the (possibly estimated) channel response of the interfering signal). Estimation of the channel response of the interfering signal may be performed using any suitable approach. For example, when the wireless receiver comprises a plurality of receive antenna elements for the spatial selective reception, two or more of the receive antenna elements may be configured for estimation of the channel response of the interfering signal.

Although not shown in FIG. 1, the channel response $\varphi_1$ (e.g., including an angle of arrival for a dominating channel path, such as a LOS path) of the desired signal may similarly be estimated or otherwise obtained.

If the receiver is a uniform linear array and signal propagation is in free space, the received signal at antenna m can be modelled as $$x_m(t) = s_1(t) e^{-j\varphi_1 m} + s_2(t) e^{-j\varphi_2 m},$$

where the channel response $\varphi_1$ is a function of the angle of arrival (AoA), or incidence angle, of the desired signal, and the channel response $\varphi_2$ is a function of the angle of arrival (AoA), or incidence angle, of the interfering signal. It should be understood that the application of a uniform linear array is merely an example used for illustrative purposes and is not intended as limiting.

After amplification, the received signal can be written as $$\begin{aligned} y_m(t) &= b_1(s_1(t)e^{-j\varphi_1 m} + s_2(t)e^{-j\varphi_2 m}) + \\ &\quad b_3(s_1(t)e^{-j\varphi_1 m} + s_2(t)e^{-j\varphi_2 m})|s_1(t)e^{-j\varphi_1 m} + s_2(t)e^{-j\varphi_2 m}|^2 = \\ &= b_1 s_1(t) e^{-j\varphi_1 m}\left(1 + c|s_1(t)e^{-j\varphi_1 m} + s_2(t)e^{-j\varphi_2 m}|^2\right) + \\ &\quad b_3 s_2(t) e^{-j\varphi_2 m}\left(1 + c|s_1(t)e^{-j\varphi_1 m} + s_2(t)e^{-j\varphi_2 m}|^2\right) = \\ &= b_1 s_1(t)(1 + c(|s_1(t)|^2 + 2|s_2(t)|^2))e^{-j\varphi_1 m} + \\ &\quad b_1 s_2(t)(1 + c(2|s_1(t)|^2 + |s_2(t)|^2))e^{-j\varphi_2 m} + \\ &\quad b_3(s_1(t))^2(s_2(t))^* e^{-j(\varphi_1-\varphi_2)m} + b_3(s_1(t))^*(s_2(t))^2 e^{-j(\varphi_2-\varphi_1)m} \end{aligned}$$

where $c = b_3/b_1$.

Notice that some of the terms in the expression for $y_m(t)$ might not overlap with the desired signal in the frequency domain, depending on the frequency of the interfering signal. Such terms, if any, may of course be filtered away by a band pass filter, additionally or alternatively to the spatial filtering described herein.

In step 130, the composite signal is filtered using a spatial filter for a channel response of the desired signal to provide a first intermediate signal component $\hat{s}_1(t)$.

Similarly, in step 140, the composite signal using a spatial filter for a channel response of the interfering signal to provide a second intermediate signal component $\hat{s}_2(t)$.

The spatial filtering of steps 130 and 140 may be performed according to any suitable filtering approach. Typically, the filtering may be performed over all (or a sub-set) of the antenna elements using filter coefficients that are based on the corresponding channel response.

For example, the spatial filtering may be implemented as $$\hat{s}_1(t) = \sum_{m=1}^{M} \frac{1}{b_1} e^{j\varphi_1 m} y_m(t)$$

$$\hat{s}_2(t) = \sum_{m=1}^{M} \frac{1}{b_1} e^{j\varphi_2 m} y_m(t)$$

If the number M of antennas is large and the two incidence angles $\varphi_1$ and $\varphi_2$ are such that a spatial filter can distinguish them, then the dominant terms left after the spatial filtering are $$\hat{s}_1(t) \approx s_1(t)(1+c(|s_1(t)|^2+2|s_2(t)|^2))$$

$$\hat{s}_2(t) \approx s_2(t)(1+c(2|s_1(t)|^2+|s_2(t)|^2))$$

wherein $|s_1(t)|^2$ may be negligible compared to $|s_2(t)|^2$. In a higher order model, the following may apply $$\hat{s}_1(t) \approx s_1(t)\left(1 + \Sigma_{p=1,3,...,P} \frac{b'_p}{b'_1}(p-1)|s_2(t)|^{p-1}\right) + s_1(t)\Sigma_{p=1,3,...,P} \frac{b'_p}{b'_1}|s_1(t)|^{p-1}.$$

It may be seen that $\hat{s}_1(t)$ depends on $s_2(t)$ only via the magnitude $|s_2(t)|^2$ of the interfering signal. This magnitude may be estimated by solving the third degree equation $$|\hat{s}_2(t)|^2 = |s_2(t)|^2|1+c(2|s_1(t)|^2+|s_2(t)|^2)|^2,$$

where $\hat{s}_2(t)$ and c are known. This equation can be solved either algebraically or using a look-up table. However, a simplified method that might be easier to implement in real time with less hardware would be to neglect the comparatively weak signal $|s_1(t)|^2$, which results in the simplified equation $$|\hat{s}_2(t)|^2=|s_2(t)|^2|1+c|s_2(t)|^2|^2.$$

It should be noted that a higher order model may be used also in the estimation of $|s_2(t)|^2$.

Using an estimation of $|s_2(t)|^2$ thus obtained, the unwanted modulation of the desired signal in view of the interfering signal, $\hat{s}_1(t) \approx s_1(t)(1+c(|s_1(t)|^2+2|s_2(t)|^2))$, may be revered by application of $$s_1(t)=\hat{s}_1(t)/(1+2c|s_2(t)|^2),$$

which may be termed interference (or blocker, jammer, etc.) demodulation. It can be shown (by approximation using the assumption that the comparatively weak signal can be neglected as mentioned above) that the interference demodulation above approximates $s_1(t)$, since, using the approximation $|\hat{s}_2(t)|^2=|s_2(t)|^2|1+c|s_2(t)|^2|^2$, it may be seen that $$s_1(t) \approx \hat{s}_1(t)+\hat{s}_1(t)|s_1(t)|^2/(1+2c|s_2(t)|^2),$$

where the second term may be disregarded.

In a higher order model, the following interference (or blocker) demodulation may apply $$s_1(t) = \hat{s}_1(t)\bigg/\bigg(1 + \Sigma_{1,3,\ldots,p}\frac{b'_p}{b'_1}(p-1)|s_2(t)|^{p-1}\bigg),$$

which still only requires knowledge of the squared magnitude $|s_2(t)|^2$.

In step 150, a squared amplitude of the interfering signal is estimated based on the second intermediate signal component and a model of the non-linearity.

Estimating the squared amplitude of the interfering signal may, for example, comprise approximating an expression for the second intermediate signal component by two or more of its leading terms, wherein the expression for the second intermediate signal component is determined by the model of the non-linearity, and solving an equation for the squared amplitude of the interfering signal, wherein the equation for the squared amplitude of the interfering signal is formed by the second intermediate signal component and the approximated expression for the second intermediate signal component.

Approximating the expression for the second intermediate signal component may comprise approximating the second intermediate signal component, $\hat{s}_2(t)$, as $$\hat{s}_2(t) \approx s_2(t)(1+c(2|s_1(t)|^2+|s_2(t)|^2)),$$

wherein $s_1(t)$ represents the desired signal, $s_2(t)$ represents the interfering signal, and $c=b_3/b_1$ is a parameter of the model of the non-linearity.

In some embodiments, approximating the expression for the second intermediate signal component comprises disregarding contributions by the desired signal, resulting in $$\hat{s}_2 \approx s_2(t)(1+c|s_2(t)|^2).$$

The equation for the squared amplitude of the interfering signal may be $$|\hat{s}_2(t)|^2=|s_2(t)|^2|1+c(2|s_1(t)|^2+|s_2(t)|^2)|^2,$$

which is simplified to $$|\hat{s}_2(t)|^2=|s_2(t)|^2|1+c|s_2(t)|^2|^2$$

if contributions by the desired signal are disregarded.

In step 160, the desired signal is estimated based on the first intermediate signal component, the estimated squared amplitude of the interfering signal, and the model of the non-linearity.

Estimating the desired signal may, for example, comprise approximating an expression for the first intermediate signal component by two or more of its leading terms, wherein the expression for the first intermediate signal component is determined by the model of the non-linearity and comprises the squared amplitude of the interfering signal as an interfering signal variable, and wherein approximating comprises disregarding contributions by the squared amplitude of the desired signal, and solving an equation for the desired signal, wherein the equation for the desired signal is formed by the first intermediate signal component and the approximated expression for the first intermediate signal component wherein the estimated squared amplitude of the interfering signal is used as a value of the interfering signal variable.

Approximating the expression for the first intermediate signal component may comprise approximating the first intermediate signal component, $\hat{s}_1(t)$, as $$\hat{s}_1(t) \approx s_1(t)(1+c(|s_1(t)|^2+2|s_2(t)|^2)),$$

which is simplified to $$\hat{s}_1(t) \approx s_1(t)(1+2c|s_2(t)|^2)$$

if contributions by the squared magnitude of the desired signal are disregarded. In the latter case, the equation for the desired signal may be $$s_1(t)=\hat{s}_1(t)/(1+2c|s_2(t)|^2),$$

wherein $|s_2(t)|^2$ may be termed interfering signal variable.

Figure 2:
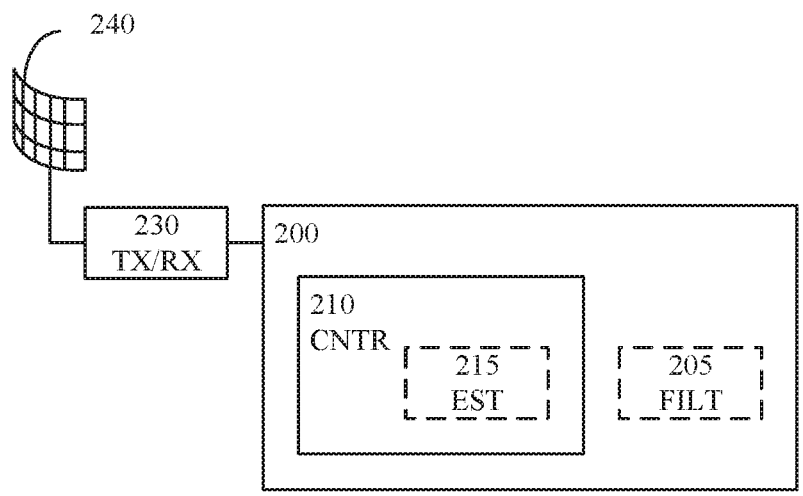
FIG. 2 is a schematic block diagram illustrating an example arrangement according to some embodiments.

FIG. 2 schematically illustrates an example arrangement (e.g., an apparatus) 200 according to some embodiments. The apparatus may be for a wireless receiver configured for spatial selective reception. The spatial selective reception may be implemented using an antenna array 240.

Furthermore, the apparatus may be for mitigation of an interfering signal leaked into a frequency range of a desired signal due to non-linearity of hardware components of the receiver. For example, the apparatus may be configured to perform (or cause performance of) one or more steps of the example method 100 described in connection to FIG. 1. The apparatus may be comprised in a wireless receiver and/or a wireless communication device.

The apparatus comprises controlling circuitry (CNTR; e.g., a controller) 210 configured to cause reception of a composite signal comprising the desired signal and the interfering signal as described above (compare with step 110 of FIG. 1).

To this end the apparatus may comprise or be otherwise associated with (e.g., operatively connected to) receiving circuitry (RX; e.g., a receiver); illustrated in FIG. 2 as part of transceiving circuitry (TX/RX; e.g., a transceiver) 230. The receiving circuitry may be configured to receive the composite signal via the antenna array 240.

The controlling circuitry 210 may also be configured to cause filtering of the composite signal using a spatial filter for a channel response of the desired signal to provide a first intermediate signal component, and filtering of the composite signal using a spatial filter for a channel response of the interfering signal to provide a second intermediate signal component as described above (compare with steps 130 and 140 of FIG. 1).

To this end the apparatus may comprise or be otherwise associated with filtering circuitry (FILT; e.g. one or more filters) 205. The filtering circuitry may be configured to spatially filter the composite signal as described above (compare with steps 130 and 140 of FIG. 1).

The controlling circuitry 210 may also be configured to cause estimation of a squared amplitude of the interfering signal based on the second intermediate signal component and a model of the non-linearity, and estimation of the desired signal based on the first intermediate signal component, the estimated squared amplitude of the interfering signal, and the model of the non-linearity as described above (compare with steps 150 and 160 of FIG. 1).

To this end the apparatus may comprise or be otherwise associated with estimation circuitry (EST; e.g. one or more estimators) 215. The estimation circuitry may be configured to estimate the squared amplitude of the interfering signal and/or the desired signal as described above (compare with steps 150 and 160 of FIG. 1).

Figure 3:
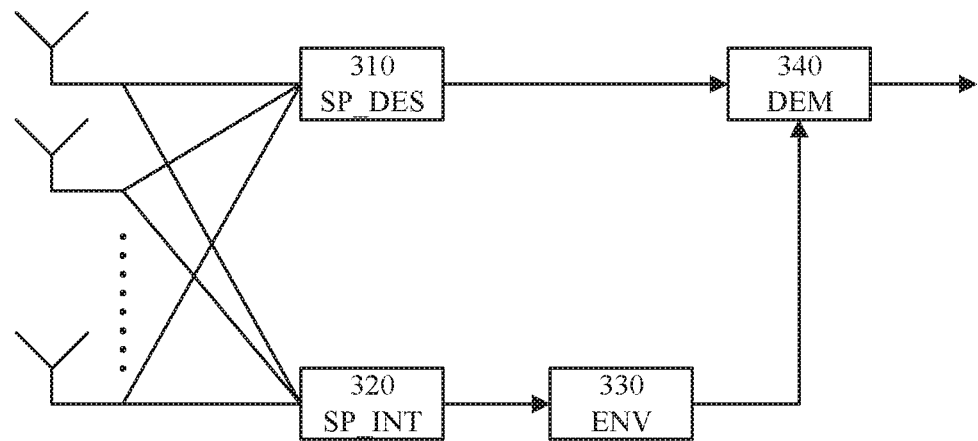
FIG. 3 is a schematic block diagram illustrating an example arrangement according to some embodiments.

FIG. 3 schematically illustrates an example arrangement (e.g., an apparatus) according to some embodiments. In some embodiments, the example arrangement of FIG. 3 may be seen as an alternative to the example arrangement of FIG. 2. In some embodiments, the example arrangement of FIG. 3 may be seen as an implementation of the example arrangement of FIG. 2.

The arrangement of FIG. 3 comprises (first) spatial processing circuitry for the desired signal (SP_DES; e.g., a signal processor) 310 and (second) spatial processing circuitry for the interfering signal (SP_INT; e.g., a signal processor) 320 (compare with the filtering circuitry 205 of FIG. 2).

The spatial processing circuitry 310 may be configured to filter the composite signal using a spatial filter for a channel response of the desired signal to provide a first intermediate signal component.

The spatial processing circuitry 320 may be configured to filter the composite signal using a spatial filter for a channel response of the interfering signal to provide a second intermediate signal component.

The arrangement of FIG. 3 also comprises envelope detecting circuitry (ENV; e.g., an envelope detector) 330 configured to estimate the squared amplitude of the interfering signal based on the second intermediate signal component and a model of the non-linearity (compare with the estimation circuitry 215 of FIG. 2).

The arrangement of FIG. 3 also comprises demodulating circuitry (DEM; e.g., a demodulator) 340 configured to estimate the desired signal based on the first intermediate signal component, the estimated squared amplitude of the interfering signal, and the model of the non-linearity (compare with the estimation circuitry 215 of FIG. 2).

Figure 4:
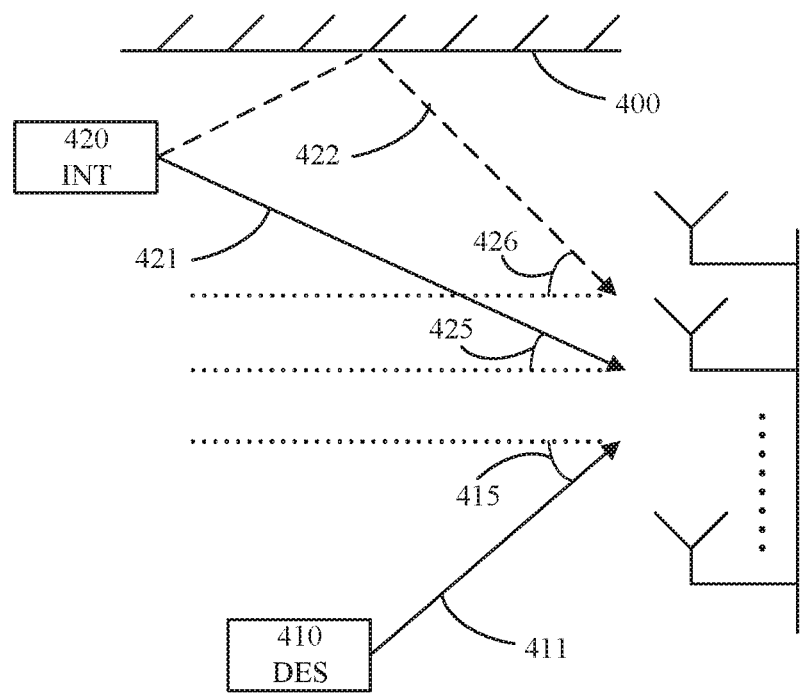
FIG. 4 is a schematic drawing illustrating example signal paths according to some embodiments.

FIG. 4 schematically illustrates example signal paths according to some embodiments. The scenario of FIG. 4 illustrates a transmitter (DES) 410 of the desired signal 411, which arrives at the wireless receiver at an angle 415 in line-of-sight conditions. The scenario of FIG. 4 also illustrates a transmitter (INT) 420 of the interfering signal 421, which arrives at the wireless receiver at an angle 425 in line-of-sight conditions. Also illustrated is arrival of the interfering signal 422 at the wireless receiver at an angle 426 in non-line-of-sight conditions, caused by reflection at an object 400. The signal path or paths of a particular scenario collectively result in the (spatial) channel response as is well known in the art, and will therefore not be elaborated on in detail herein.

As mentioned above (see e.g. step 120 of FIG. 1) the channel response of the interfering signal may be estimated using various approaches. Some of these approaches will now be described in more detail. It should be note that such approaches may be applied in any scenario where a channel response of an interfering signal needs to be estimated.

According to one aspect, this is achieved by a method of a wireless receiver configured for spatial selective reception, for mitigation of an interfering signal leaked into a frequency range of a desired signal due to non-linearity of hardware components of the receiver.

The method comprises receiving a composite signal comprising the desired signal and the interfering signal.

The wireless receiver comprises a plurality of receive antenna elements for the spatial selective reception, and the method comprises configuring two or more of the receive antenna elements for estimation of the channel response of the interfering signal.

The method may also comprise processing the received composite signal based on the estimation of the channel response of the interfering signal, thereby mitigating the interfering signal.

Example processing of the received composite signal comprises projecting the composite signal onto a subspace which is orthogonal (or close to orthogonal) to the channel response of the interfering signal. Generally, the received composite signal may be processed using any suitable spatial processing (e.g., zero-forcing nulling, minimum mean square error (MMSE) filtering, etc.) to suppress the interfering signal.

Other aspects relate to corresponding apparatus, wireless receiver, wireless communication device and computer program product.

By application of such estimation of the channel response of the interfering signal, out-of-band blocker cancellation may be achieved for advanced antenna systems according to some embodiments. This, may lead to improved robustness against out-of-band blockers, which may, in turn, relax the linearity requirements and/or reduce cost for receiver frontends.

In a typical scenario, some of the antenna elements are configured for out-of-band reception and specifically for estimation of dominant components of interference (e.g., angle-of-arrival (AoA) of dominant components, channel response, frequency, etc.).

Such estimates of the interference characteristics may be forwarded to a signal processing unit that performs receive beamforming of the received in-band signal. In this beamforming, appropriate spatial processing (for example, zero-forcing nulling or MMSE filtering) may be performed using the estimates of the interference characteristics to suppress the out-of-band interference that leaks into the in-band.

For example, if $\hat{h}_b$ is an estimate of the spatial channel response for the interfering signal, then the signal processing may pre-process the received composite signal by projecting it onto the orthogonal complement of $\hat{h}_b$. This has the effect of removing any incoming signal component which has the spatial channel response $\hat{h}_b$.

Mathematically, the projection amounts to multiplication with the matrix $$\Pi^\perp_{\hat{h}_b} = I_M - \lambda \frac{\hat{h}_b \hat{h}_b^H}{\|\hat{h}_b\|^2}$$

in which $0<\lambda \leq 1$ is a regularization parameter and $I_M$ is the $M \times M$ identity matrix. For multiple directions, D, of the spatial channel response for the interfering signal this would generalize to $$\Pi_{\hat{H}_b}^{\perp} = I_M - \lambda \hat{H}_b (\hat{H}_b^H \hat{H}_b)^{-1} \hat{H}_b^H$$

In which $\hat{H}_b = [\hat{h}_1, \ldots, \hat{h}_D] \in \mathbb{C}^{M \times D}$ is a channel matrix consisting of the D dominant AoAs; or channel responses (in non-LOS).

In principle, the matrix $\hat{H}_b$ may not necessarily comprise D steering vectors associated with D dominant AoAs, but could describe a sub-space in which the interferer (blocker) resides. This would be particularly relevant in a non-LOS scenario.

Figure 5:
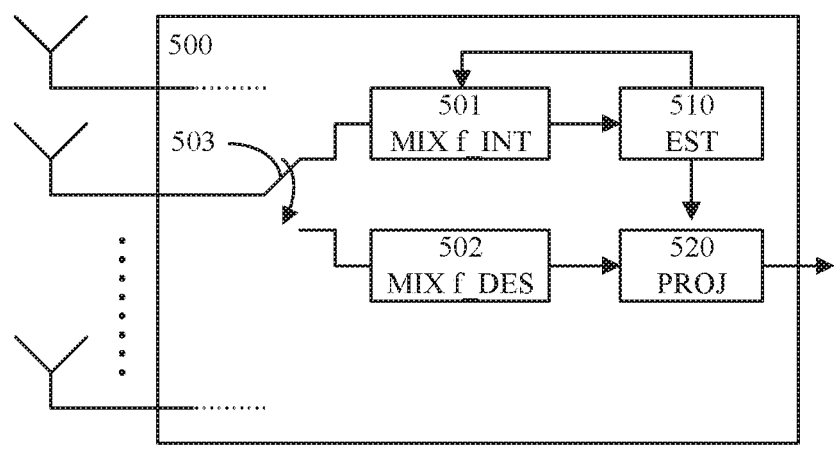
FIG. 5 is a schematic block diagram illustrating an example arrangement according to some embodiments.
Figure 6:
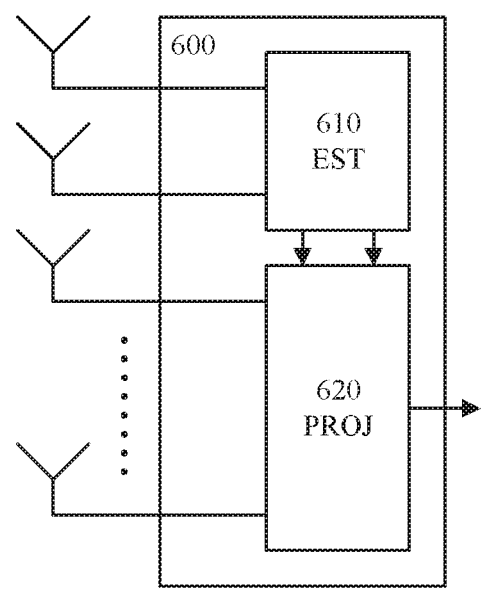
FIG. 6 is a schematic block diagram illustrating an example arrangement according to some embodiments.

FIGS. 5 and 6 schematically illustrate two example arrangements (e.g., apparatuses) 500, 600 according to some embodiments. The apparatuses may be for a wireless receiver configured for spatial selective reception. The spatial selective reception may be implemented using an antenna array.

Furthermore, the apparatuses may be for mitigation of an interfering signal leaked into a frequency range of a desired signal due to non-linearity of hardware components of the receiver. For example, the apparatuses may be configured to perform (or cause performance of) one or more steps as described herein. The apparatuses may be comprised in a wireless receiver and/or a wireless communication device.

In the embodiment of FIG. 5, each (or at least some) of the antenna elements is reconfigurable through a switch 503 (only shown for one antenna element in FIG. 5). When the switch is in a first position, the antenna element receives signals in-band. When the switch is in a second position (as in FIG. 5), the antenna element receives signals out-of-band.

The apparatus 500 comprises—for each (or at least some) of the antenna elements—the switch 503 (switching circuitry), a mixer (MIX f_INT; mixing circuitry) 501 for mixing the received signal with an out-of-band frequency to enable out-of-band reception, and a mixer (MIX f_DES; mixing circuitry) 502 for mixing the received signal with an in-band frequency to enable in-band reception.

The apparatus 500 also comprises an estimator (EST; estimating circuitry) 510 configured to estimate the channel response of the interfering signal. The result may be used to control the out-of-band frequency used in the mixer 501 and is also forwarded to a projector (PROJ; projecting circuitry) 520 configured to project the signal of the in-band reception to a sub-space orthogonal to the channel response of the interfering signal.

In the embodiment of FIG. 6, a sub-set (at least two) of the antenna elements are statically configured to receive signals out-of-band.

The apparatus 600 comprises an estimator (EST; estimating circuitry) 610 configured to estimate the channel response of the interfering signal. The result is forwarded to a projector (PROJ; projecting circuitry) 620 configured to project the signal of the in-band reception to a sub-space orthogonal to the channel response of the interfering signal.

In this embodiment, the receivers dedicated to estimation of blocker parameters may be used for other purposes during downlink transmission, for example estimation of digital pre-distortion parameters.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 7:
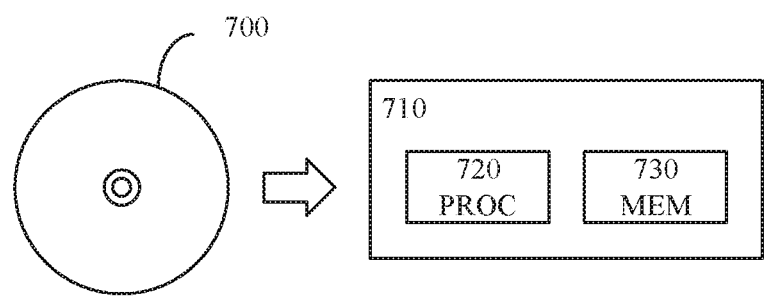
FIG. 7 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC) 720, which may, for example, be comprised in a receiver (e.g., a wireless communication device or a network node) 710. When loaded into the data processing unit, the computer program may be stored in a memory (MEM) 730 associated with or comprised in the data-processing unit. According to some embodiments, the computer program may, when loaded into and run by the data processing unit, cause execution of method steps according to, for example, any of the methods illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method performed by a wireless receiver for mitigation of an interfering signal leaked into a frequency range of a desired signal due to non-linearity of hardware components of the receiver, the method comprising:
receiving a composite signal comprising the desired signal and the interfering signal;
filtering the composite signal using a spatial filter for a channel response of the desired signal to provide a first intermediate signal component;
filtering the composite signal using a spatial filter for a channel response of the interfering signal to provide a second intermediate signal component;
estimating a squared amplitude of the interfering signal based on the second intermediate signal component and a model of the non-linearity; and
estimating the desired signal based on the first intermediate signal component, the estimated squared amplitude of the interfering signal, and the model of the non-linearity,
wherein the model of the non-linearity is a polynomial function wherein each term consists of the product of a coefficient, an input variable, and a squared absolute value of the input variable.

2. The method of claim 1, wherein estimating the squared amplitude of the interfering signal comprises:
approximating an expression for the second intermediate signal component by selecting two or more leading terms of the second intermediate signal component, wherein the expression for the second intermediate signal component is determined by the model of the non-linearity; and
solving an equation for the squared amplitude of the interfering signal, wherein the equation for the squared amplitude of the interfering signal is formed by the second intermediate signal component and the approximated expression for the second intermediate signal component.

3. The method of claim 2, wherein approximating the expression for the second intermediate signal component comprises approximating the second intermediate signal component, $\hat{s}_2(t)$, as $\hat{s}_2(t) \approx s_2(t)(1+c(2|s_1(t)|^2+|s_2(t)|^2))$, wherein $s_1(t)$ represents the desired signal, $s_2(t)$ represents the interfering signal, and c is a parameter of the model of the non-linearity.

4. The method of claim 2, wherein approximating the expression for the second intermediate signal component comprises disregarding contributions by the desired signal.

5. The method of claim 4, wherein the equation for the squared amplitude of the interfering signal is $|\hat{s}_2(t)|^2 = |s_2(t)|^2 |1+c|s_2(t)|^2|^2$, wherein $\hat{s}_2(t)$ represents the second intermediate signal component and $s_2(t)$ represents the interfering signal.

6. The method of claim 5, wherein estimating the desired signal comprises:
approximating an expression for the first intermediate signal component by selecting two or more leading terms of the first intermediate signal component, wherein the expression for the first intermediate signal component is determined by the model of the non-linearity and comprises the squared amplitude of the interfering signal as an interfering signal variable, and wherein approximating comprises disregarding contributions by a squared amplitude of the desired signal; and
solving an equation for the desired signal, wherein the equation for the desired signal is formed by the first intermediate signal component and the approximated expression for the first intermediate signal component wherein the estimated squared amplitude of the interfering signal is used as a value of an interfering signal variable.

7. The method of claim 6, wherein approximating the expression for the first intermediate signal component comprises approximating the first intermediate signal component, $\hat{s}_1(t)$, as $\hat{s}_1(t) \approx s_1(t)(1+2c|s_2(t)|^2)$, wherein $s_1(t)$ represents the desired signal, $s_2(t)$ represents the interfering signal, and c is a parameter of the model of the non-linearity.

8. The method of claim 6, wherein the equation for the desired signal is $s_1(t) = \hat{s}_1(t)/(1+2c|s_2(t)|^2)$, wherein $s_1(t)$ represents the desired signal, $\hat{s}_1(t)$ represents the first intermediate signal component and $|s_2(t)|^2$ represents the interfering signal variable.

9. The method of claim 1, further comprising estimating the channel response of the interfering signal.

10. The method of claim 9, wherein the wireless receiver is configured for spatial selective reception and comprises a plurality of receive antenna elements for the spatial selective reception, and wherein two or more of the receive antenna elements are configured for the estimation of the channel response of the interfering signal.

11. A computer program product comprising a non-transitory computer readable medium, having thereon a computer program comprising program instructions, the computer program being loadable into a data processing unit and configured to cause execution of the method of claim 1, when the computer program is run by the data processing unit.

12. An apparatus for mitigation of an interfering signal leaked into a frequency range of a desired signal due to non-linearity of hardware components of the receiver, the apparatus comprising controlling circuitry configured to cause:
reception of a composite signal comprising the desired signal and the interfering signal;
filtering of the composite signal using a spatial filter for a channel response of the desired signal to provide a first intermediate signal component;
filtering of the composite signal using a spatial filter for a channel response of the interfering signal to provide a second intermediate signal component;
estimation of a squared amplitude of the interfering signal based on the second intermediate signal component and a model of the non-linearity; and
estimation of the desired signal based on the first intermediate signal component, the estimated squared amplitude of the interfering signal, and the model of the non-linearity,
wherein the model of the non-linearity is a polynomial function wherein each term consists of the product of a coefficient, an input variable, and a squared absolute value of the input variable.

13. The apparatus of claim 12, wherein the controlling circuitry is configured to cause the estimation of the squared amplitude of the interfering signal by causing:

approximation of an expression for the second intermediate signal component by selecting two or more leading terms of the second intermediate signal component, wherein the expression for the second intermediate signal component is determined by the model of the non-linearity; and solving of an equation for the squared amplitude of the interfering signal, wherein the equation for the squared amplitude of the interfering signal is formed by the second intermediate signal component and the approximated expression for the second intermediate signal component.

14. The apparatus of claim 13, wherein the controlling circuitry is configured to cause the approximation of the expression for the second intermediate signal component by causing disregard of contributions by the desired signal.

15. The apparatus of claim 12, wherein the controlling circuitry is configured to cause the estimation of the desired signal by causing:

approximation of an expression for the first intermediate signal component by selecting two or more leading terms of the first intermediate signal component, wherein the expression for the first intermediate signal component is determined by the model of the non-linearity and comprises the squared amplitude of the interfering signal as an interfering signal variable, and wherein the approximation comprises disregard of contributions by a squared amplitude of the desired signal; and solving of an equation for the desired signal, wherein the equation for the desired signal is formed by the first intermediate signal component and the approximated expression for the first intermediate signal component wherein the estimated squared amplitude of an interfering signal is used as a value of an interfering signal variable.

16. The apparatus of claim 12, wherein the controlling circuitry is further configured to cause estimation of the channel response of the interfering signal.

17. The apparatus of claim 16, further comprising a plurality of receive antenna elements for spatial selective reception, and wherein two or more of the receive antenna elements are configured for the estimation of the channel response of the interfering signal.

18. A wireless receiver comprising the apparatus of claim 12 and a plurality of receive antenna elements for spatial selective reception.

* * * * *